(12) United States Patent
Dribinski et al.

(10) Patent No.: US 9,906,417 B2
(45) Date of Patent: *Feb. 27, 2018

(54) METHOD OF OPERATING A SELF ORGANIZING NETWORK AND SYSTEM THEREOF

(71) Applicant: Cellwize Wireless Technologies Ltd., Tel Aviv (IL)

(72) Inventors: Daniel Dribinski, Rishon-Lezion (IL); Evgeny Finkel, Petah-Tikva (IL); Sergei Edelstein, Herzliya (IL)

(73) Assignee: Cellwize Wireless Technologies Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,605

(22) Filed: May 29, 2017

(65) Prior Publication Data

US 2017/0310560 A1 Oct. 26, 2017

Related U.S. Application Data

(63) Continuation of application No. 15/032,334, filed as application No. PCT/IL2015/050780 on Jul. 29, 2015, now Pat. No. 9,686,151.

(30) Foreign Application Priority Data

Aug. 7, 2014 (IL) .......................................... 234002

(51) Int. Cl.
*H04L 12/28* (2006.01)
*H04L 12/24* (2006.01)
(Continued)

(52) U.S. Cl.
CPC ...... *H04L 41/5009* (2013.01); *H04L 41/0816* (2013.01); *H04W 24/02* (2013.01); *H04W 72/06* (2013.01); *H04W 84/18* (2013.01)

(58) Field of Classification Search
CPC .................. H04L 41/5009; H04L 41/0816
(Continued)

(56) References Cited

U.S. PATENT DOCUMENTS

2006/0092861 A1 5/2006 Corday et al.
2007/0280123 A1 12/2007 Atkins et al.
(Continued)

FOREIGN PATENT DOCUMENTS

EP 1641182 A2 3/2006
EP 2529519 2/2012
(Continued)

OTHER PUBLICATIONS

3GPP Organizational Partners, 3rd Generation Partnership Project, Jul. 2009.
(Continued)

*Primary Examiner* — Samina Choudhry
(74) *Attorney, Agent, or Firm* — Wiggin and Dana LLP; Gregory S. Rosenblatt; Jonathan D. Hall

(57) ABSTRACT

There is provided a method of operating a self-organizing network and system thereof. The method comprises processing data informative of network events with regard to the one or more access points and respectively served clients, thereby periodically associating the clients with the one or more access points; periodically assessing to each access point a value indicative of a privilege level of a given access point, the value being a function of priority values assigned to clients associated with the given access point during an assessing period; and using the assessed values for periodically identifying at least one access point requiring at least one corrective action in consideration of its privilege level. The method can further comprise periodically reassigning at least part of priority values to be used for assessing the values to the one or more access points, (Continued)

wherein reassigning comprises processing data periodically received by the SON system.

14 Claims, 5 Drawing Sheets

(51) Int. Cl.
    *H04W 24/02*     (2009.01)
    *H04W 72/06*     (2009.01)
    *H04W 84/18*     (2009.01)

(58) Field of Classification Search
    USPC ........................................................ 370/254
    See application file for complete search history.

(56) References Cited

U.S. PATENT DOCUMENTS

| | | |
|---|---|---|
| 2009/0075655 A1 | 3/2009 | Dobson et al. |
| 2011/0090820 A1 | 4/2011 | Hussein et al. |
| 2011/0128890 A1* | 6/2011 | Schein .................... H04L 41/12 370/255 |
| 2011/0136478 A1 | 6/2011 | Tirgui |
| 2011/0252123 A1 | 10/2011 | Sridhar et al. |
| 2012/0142347 A1 | 6/2012 | Morad et al. |
| 2012/0170471 A1* | 7/2012 | Brown .................. H04W 48/20 370/252 |
| 2012/0320766 A1 | 12/2012 | Sridhar |
| 2013/0242720 A1 | 9/2013 | Chou |
| 2013/0343222 A1 | 12/2013 | Chen et al. |
| 2014/0031006 A1 | 6/2014 | Moore et al. |
| 2015/0222527 A1 | 8/2015 | Shah et al. |

FOREIGN PATENT DOCUMENTS

| | | |
|---|---|---|
| EP | 2779718 A1 | 9/2014 |
| WO | 2014108390 A1 | 7/2014 |

OTHER PUBLICATIONS

PCT/IL2015/050780, International Search Report, dated Nov. 11, 2015.

* cited by examiner

METHOD OF OPERATING A SELF ORGANIZING NETWORK AND SYSTEM THEREOF

CROSS REFERENCE TO RELATED APPLICATION

The present application is a Continuation of U.S. patent application Ser. No. 15/032,334, titled "Method of Operating a Self Organizing Network and System Thereof" and filed Apr. 27, 2016. The contents of U.S. Ser. No. 15/032,334 are hereby incorporated herein in their entirety.

TECHNICAL FIELD

The presently disclosed subject matter relates generally to systems and methods of wireless communication and, particularly, to methods of operating self organizing networks and systems thereof.

BACKGROUND OF THE INVENTION

For today's complicated cellular networks Self Organising Network (SON) capabilities become essential in order to configure, organize, optimise performance and/or provide self-healing if/when faults occur. SON technology enables optimization of network performance and significant improvements in terms of capital expenditure (CAPEX) and operational expenditure (OPEX).

The major aspects of SON operation are self configuration, self optimization and self-healing. Self configuration enables access points (e.g. base stations, Node Bs, sectors (e.g. macrocells, picocells and femtocells), etc.) to become "Plug and Play" items. Once the system has been set up, operational characteristics of access points (APs) can be tuned, based on analyses of measurements data, thus enabling achievement of optimal network performance, coverage, and/or capacity by self-optimisation of the network. Self-optimization functions can include, for example, Load Balancing, Handover Optimization, Coverage & Capacity Optimization, Cell Outage Compensation, Energy Saving Management, etc. These optimization functions can change the coverage and capacity of a cell and, possibly, of surrounding cells, by configuring parameters (e.g. transmission power for downlink transmissions, antenna tilt, azimuth parameters, etc.) of the respective access point(s). Among the aspects addressed by the self-healing capability are detection of cell degradation and respective self-recovery of software, self-healing of board faults, cell outage recovery, and/or cell outage compensation, etc.

Typically, network optimization is as a process of improving the overall network quality, comprising improving a Quality of Service (QoS) indicative of a network's ability to provide given services with assured service level and/or improving a Quality of Experience (QoE) indicative of end users' level of satisfaction with given services. QoS can be evaluated with the help of Key Performance Indicators (KPIs) derived from data informative of network events and QoE can be evaluated with the help of Key Quality Indicators (KQIs) derived from data informative user-related events (optionally, the same data can be informative of both user related and network events). KPIs can characterize QoS of an entire network or parts thereof (e.g. one or more given access points or a group of access points, the group matching certain criteria, etc.). KQI can characterize QoE of one or more selected users, a user's segment matching certain criteria, etc.

Problems of operating self-organizing networks have been recognized in the conventional art and various techniques have been developed to provide solutions. For example:

US Patent Application No. 2007/280123 (Atkins, et al.) discloses a technique for testing, troubleshooting and evaluation of a mobile phone network. A method of processing network data includes a plurality of session related parameters. The method comprises inputting one or more queries, a query defining a statistic relating to said parameters and to be computed from said network data, formatting a query to define said statistic in terms of one or more intermediate statistics from which said statistic is computable, operating with said formatted query to determine said one or more intermediate statistics, and storing these in a data store for analysis, preferably indexed by said parameters. Entries for the parameters can be stored at time positions in a data pipe.

US Patent Application No. 2011/090820A (Hussein et al.) discloses a technique of optimizing a plurality of cell sites or sectors in a wireless network including receiving network data regarding a plurality of cell sites or sectors; determining a critical zone in which communication is degraded; determining best neighbor cell sites or sectors among the neighbor cell sites or sectors associated with the critical cell sites or sectors; determining if the critical cell sites or sectors in the critical zone have available resources for achieving a desired improvement in communications; determining if the best neighbor cell sites or sectors have available resources for achieving the desired improvement in communications; and altering wireless network parameters of the critical cell sites or sectors, or the best neighbor cells sites or sectors for achieving the desired improvement in communications. Altering wireless network parameters of the critical cell sites or sectors, or the best neighbor cell sites or sectors is performed continuously until the desired improvement in communications in the wireless network is achieved.

US Patent Application No. 2011/128890 (Schein et al.) discloses a technique of facilitating self-configuration and self-optimization of radio networks. An internal topology discovery is performed to assess characteristics of a plurality of access points within an internal network. An external cell discovery can also be performed to identify one or more access points operating within an external network. Based on the assessments obtained through the internal and/or external topology discovery processes, operational parameters are assigned to each access point within the internal network. Such operational parameters can include a transmit power associated with each radio node.

US Patent Application No. 2011/252123 (Sridhar et al.) discloses a self optimizing network wherein a policy and charging rules function (PCRF) includes an input port, a processor, and an output port. The input port receives near-real-time network state data. The processor makes optimization decisions based upon the near-real-time network state data. The processor also produces policy enforcement messages based upon the optimization decisions. The PCRF transmits the policy enforcement message via the output port.

US Patent Application No. 2011/136478 (Trigui) discloses a method of modifying communication parameters of a wireless network, the wireless network having at least two antennas, and each of the antennas providing coverage to at least one sector. The method includes obtaining measurement data for at least two sectors of the wireless network, determining, from the obtained measurement data, if a signal strength indicator of one or more sectors of the at least two sectors is at or below a target value, determining, if the one or more sectors is at or below the target value, a communication parameter to be applied to the wireless network such that the signal strength indicator of the one or more sectors is above the target value, and modifying the communication parameters of the wireless network such that the determined communication parameter is applied to the wireless network.

US Patent Application No. 2012/142347 (Morad et al.) discloses a system for obtaining information relating to an idle mobile station in a cellular network. The system includes a computing platform which is in communication with a radio network controller of the cellular network. The computing platform is configured for (i) generating and sending an input signal through the radio network controller to the radio access network; and (ii) identifying in data outputted by the radio network controller an output signal resulting from the input signal, the output signal including information relating to at least one idle mobile station.

US Patent Application No. 2013/242720 (Chou) discloses a network management device and a method for coordination of self-optimization functions in a wireless network. A network management device for coordination of self-optimization functions includes one or more processors and an interface. The interface communicates with a plurality of enhanced node Bs (eNodeBs). The interface is arranged to receive a request to change a coverage or a capacity of an enhanced node B (eNodeB). The interface is further arranged to transmit a query to the eNodeB to obtain a self-optimizing network (SON) coordination state of the eNodeB. The one or more processors are arranged to determine whether to grant or deny the request based on a coordination policy and the SON coordination state.

GENERAL DESCRIPTION

In accordance with certain embodiments of the presently disclosed subject matter, there is provided a method of operating a self-organizing network comprising a plurality of access points serving a plurality of clients. The method performed by a computerized system capable of periodically obtaining data informative of network events with regard to access points among the plurality of access points and to respectively served clients, data informative of priority values assigned to clients among the plurality of clients and data informative of quality with regard to the access points and/or to the clients. The method comprises: processing data informative of network events with regard to access points among the plurality of access points and to respectively served clients, thereby periodically associating the clients with the access points; periodically assessing to each of one or more access points among the plurality of access points a value indicative of a privilege level of a given access point, the value being a function of priority values assigned to clients associated with the given access point during an assessing period; and using the assessed values for periodically identifying at least one access point requiring at least one corrective action in consideration of its privilege level.

Identifying the at least one access point requiring at least one corrective action can be provided in accordance with non-conformity between QoS/QoE scores predefined as corresponding to privilege levels indicative by values assessed to the one or more access points and QoS/QoE scores calculated for the respective access points.

In accordance with further aspects of the presently disclosed subject matter, the method can further comprise: periodically identifying, to each of the one or more access points among the plurality of access points, clients with assigned priority values matching a priority criteria, thus giving rise to priority-matching clients; periodically identifying quality informative data related to the priority-matching clients; and using the identified quality informative data when periodically assessing values to respective access points, wherein each given assessed value being further a function of quality informative data related to priority-matching clients.

The identified quality informative data can be used for calculating for each of the one or more access points among the plurality of access points privileged QoS/QoE scores, thereby enabling dynamic monitoring of QoS/QOE of the one or more access points in consideration of priority values of the clients associated with respective access points during the assessing period.

Identifying the at least one access point requiring at least one corrective action can be provided in accordance with non-conformity between privileged QoS/QoE scores predefined to the one or more access points and privileged QoS/QoE scores calculated for the respective access points using the identified quality informative data.

In accordance with further aspects of the presently disclosed subject matter, at least part of the priority values can be obtained from a list of privileged clients, each client characterized by a pre-assigned priority value, the list received by the computerized system prior to assessing. Alternatively or additionally, at least part of priority values to be used for assessing the values to the access points, can be periodically reassigned, wherein reassigning can be provided by the computerized system and can comprise processing data periodically received by the computerized system, the data selected from a group constituted by data informative of network events, billing-related data and usage-related data. Alternatively or additionally, reassigning can be provided by the computerized system using dissatisfaction-related data at least partly derived from data informative of network events, wherein a value assessed to a given access point can be further indicative of dissatisfaction of clients associated with respective access point during the assessing period.

The value assessed to the at least one identified access point requiring at least one corrective action can be periodically used for identifying at least one desirable corrective action, thereby enabling corrective actions in consideration of priority values of associated clients.

Associating the clients with the access points can further comprise locating the clients within the access points, and wherein the at least one desirable corrective action can be identified in further consideration of locations of the clients associated with the at least one identified access point requiring at least one corrective action.

In accordance with other aspects of the presently disclosed subject matter, there is provided a computerized system configured to operate in a self-organizing network comprising a plurality of access points serving a plurality of clients. The system comprises a processor operatively connected to a first interface configured to periodically obtain data informative of network events with regard to access points among the plurality of access points and to respectively served clients and to a second interface configured to periodically receive client-related data informative, at least, of priority values assigned to clients among the plurality of clients. The processor is configured: to process data informative of network events with regard to access points among the plurality of access points and to respectively served clients, thereby to periodically associate the clients with the access points; to periodically assess to each of one or more access points among the plurality of access points a value indicative of a privilege level of a given access point, the value being a function of priority values assigned to clients associated with the given access point during an assessing period; and to use the assessed values for periodically identifying at least one access point requiring at least one corrective action in consideration of its privilege level.

The second interface can be configured to receive a list of privileged clients, each client characterized by a pre-assigned priority value, and the processor can be configured to obtain at least part of the priority values from the list.

The processor can be further configured to periodically reassign at least part of priority values to be used for assessing the values to the access points, and wherein reassignment comprises processing data periodically received via the first and/or the second interface, the data selected from a group constituted by data informative of network events, billing-related data and usage-related data. Alternatively or additionally, the processor can be configured to periodically reassign at least part of priority values to be used for assessing the values to the access points, wherein reassignment can be provided by using dissatisfaction-related data at least partly derived by the processor from data informative of network events, and wherein a value assessed to a given access point can be further indicative of dissatisfaction of clients associated with respective access point during the assessing period.

In accordance with other aspects of the presently disclosed subject matter, there is provided a method of operating a self-organizing network comprising a plurality of access points serving a plurality of clients. The method is performed by a computerized system and comprises: upon obtaining data indicative of privileged clients among the plurality of clients, tracking data informative of network events with regard to the privileged clients; processing data informative of network events with regard to the privileged clients, thereby periodically associating the privileged clients with the access points and periodically identifying one or more privileged access points; tracking quality informative data with regard to the privileged access points and periodically assessing to each of one or more privileged access points among the plurality of access points a value being a function of priority values assigned to clients associated with the respective access point during an assessing period and quality informative data related to privileged clients associated with the given privileged access point during the assessing period; and using the assessed values for periodically identifying at least one privileged access point requiring at least one corrective action.

The method can further comprise periodically using the values assessed to the at least one identified privileged access point requiring at least one corrective action for identifying at least one desirable corrective action, thereby enabling corrective actions in consideration of priority values of associated clients.

Identifying the at least one privileged access point requiring at least one corrective action can be provided in accordance with non-conformity between predefined QoS/QoE scores corresponding to the one or more privileged access points and QoS/QoE scores calculated for the respective privileged access points using quality informative data.

In accordance with further aspects of the presently disclosed subject matter, at least part of data indicative of privileged clients and priority values thereof can be obtained from a list of privileged clients, each client characterized by a pre-assigned priority value, the list received by the computerized system prior to assessing.

The method can further comprise periodically updating data indicative of privileged clients among the plurality of clients, wherein updating can be provided by the computerized system and can comprise processing data periodically received by the computerized system, the data selected from a group constituted by data informative of network events, billing-related data and usage-related data.

In accordance with further aspects of the presently disclosed subject matter, at least part of priority values to be used for assessing the values to the access points, can be periodically reassigned, wherein reassigning can be provided by the computerized system and can comprise processing data periodically received by the computerized system, the data selected from a group constituted by data informative of network events, billing-related data and usage-related data. Alternatively or additionally, reassigning can be provided by the computerized system using dissatisfaction-related data at least partly derived from data informative of network events, wherein a value assessed to a given access point can be further indicative of dissatisfaction of clients associated with respective access point during the assessing period.

Optionally, all access points associated during a processing period with the privileged clients are identified as the privileged access points. Alternatively, periodically identifying one or more privileged access points can comprise selecting, among access points associated with the privileged clients during a processing period, one or more access points matching predefined selection criteria. Alternatively or additionally, periodically identifying one or more privileged access points can comprise selecting, among access points statistically associated with the privileged clients, one or more access points matching predefined selection criteria, wherein statistical association between access points and privileged clients can be periodically updated.

In accordance with further aspects of the presently disclosed subject matter, the method can further comprise: periodically identifying, to each of the one or more privileged access points, clients with assigned priority values matching a priority criteria, thus giving rise to priority-matching clients; identifying quality informative data related to the priority-matching clients; and using the identified quality informative data when periodically assessing values to respective access points, wherein each given assessed value being further a function of quality informative data related to priority-matching clients. Optionally, all privileged clients can match the priority criteria.

The method can further comprise using the identified quality informative data for calculating, for each of the one or more privileged access points, privileged QoS/QoE scores, thereby enabling dynamic monitoring of QoS/QOE of the one or more privileged access points in consideration of priority values of the clients associated with respective privileged access points during the assessing period.

In accordance with further aspects of the presently disclosed subject matter, identifying the at least one privileged access point requiring at least one corrective action can provided in accordance with non-conformity between privileged QoS/QoE scores predefined to the one or more privileged access points and privileged QoS/QoE scores calculated for the respective privileged access points using the identified quality informative data.

In accordance with further aspects of the presently disclosed subject matter, associating the clients with the privileged access points can further comprise locating the clients within the privileged access points, and wherein the at least one desirable corrective action can be identified in further consideration of locations of the clients associated with the at least one identified privileged access point requiring at least one corrective action.

In accordance with other aspects of the presently disclosed subject matter, there is provided a computerized system configured to operate in a self-organizing network comprising a plurality of access points serving a plurality of clients. The system comprises a processor operatively connected to a first interface configured to periodically obtain data informative of network events with regard to access points among the plurality of access points and to respectively served clients and to a second interface configured to periodically receive client-related data informative, at least, of priority values assigned to clients among the plurality of clients. The processor is configured: upon obtaining data indicative of privileged clients among the plurality of clients, to track data informative of network events with regard to the privileged clients; to process data informative of network events with regard to the privileged clients, thereby periodically associating the privileged clients with the access points and periodically identifying one or more privileged access points; to track quality informative data with regard to the privileged access points and periodically assess to each of one or more privileged access points among the plurality of access points a value being a function of priority values assigned to clients associated with the respective access point during an assessing period and quality informative data related to privileged clients associated with the given privileged access point during the assessing period; and to use the assessed values for periodically identifying at least one privileged access point requiring at least one corrective action.

Among advantages of certain embodiments of the presently disclosed subject matter is capability of near real time network self-adaptation and prioritizing services according to an operator's business needs.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "calculating", "determining", "generating", "identifying", "selecting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, a SON system disclosed in the present application.

It is to be understood that the term "non-transitory" is used herein to exclude transitory, propagating signals, but to include, otherwise, any volatile or non-volatile computer memory technology suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

The references cited in the Background teach many principles of SON operation that may be applicable to the presently disclosed subject matter. Therefore the full contents of these publications are incorporated by reference herein where appropriate for appropriate teachings of additional or alternative details, features and/or technical background.

Embodiments of the presently disclosed subject matter are not described with reference to any particular programming language. It will be appreciated that a variety of programming languages may be used to implement the teachings of the presently disclosed subject matter as described herein.

Figure 1:
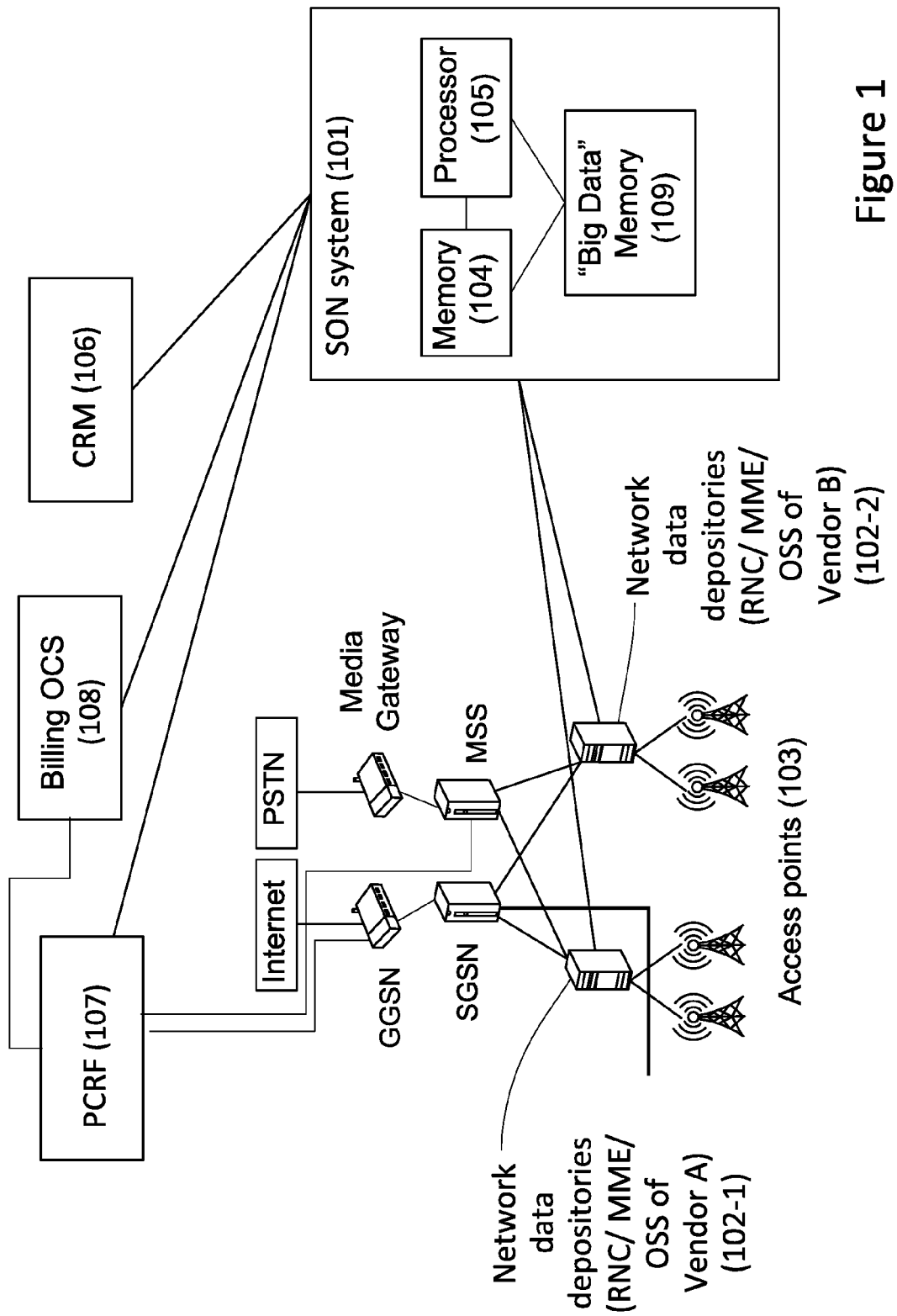
FIG. 1 illustrates a generalized network environment including a SON system configured in accordance with certain embodiments of the presently disclosed subject matter.

Bearing this in mind, attention is drawn to FIG. 1 illustrating a non-limiting example of a schematic network environment including a SON system configured in accordance with certain embodiments of the presently disclosed subject matter. As illustrated in FIG. 1, a SON system (101) is operatively connected to one or more OSS (Operation and Support System) servers and/or to Radio Network Controller(s) (RNC) and/or Mobile Management Entities (MME) provided by one or more vendors. Unless specifically stated otherwise, any depository of network-related data (e.g. OSS, RNC, etc.) is referred to hereinafter as a network data (ND) depository (102).

The SON system is further operatively connected (by direct connection or through a mediation layer as, for example, OSS server) to access points (103) of the cellular network. The SON system can be configured to provide, directly or indirectly, corrective actions (e.g. self-configuring, self-optimizing and/or self-healing, etc.) with regard to one or more access points.

The SON system is configured to obtain from one or more network data (ND) depositories data informative of events registered in the ND depositories. Typically, the SON system periodically receives (in push and/or pull mode) log records collected at the one or more ND depositories during a certain period of time $P_{ND}$ (e.g. time specified as minimal collection time for a certain ND depository, etc.) and accommodates the obtained records and/or derivatives thereof in a memory (104). Likewise, the SON system can periodically receive from ND depositories (e.g. from OSS) KPIs, KQIs or other quality related data derived from the log records. Alternatively or additionally, the SON system can derive KPIs, KQIs and/or other quality related data directly from the obtained log records.

Each registered event is associated with one or more records. By way of non-limiting example, an event can be associated with a single record (e.g. propagation delay (PD) record) comprising respective timestamp (TS), IDs of cellular device (IMSI) and ID of respective access point (CELL_ID). By way of another non-limiting example, an event (e.g. RRC measurement) can be associated with a group of records characterized by the same IMSI and TS and concurrently obtained for different access points (i.e. comprising different CELL IDs). Each such record can comprise signal strength (RSCP), ratio of signal to noise (EcNo), FrameOffset/ChipOffset and, optionally, others fields. The log records are characterized at least by identification information (e.g. IDs of cellular device (IMSI) and access point (CELL_ID), time-indicative information (e.g. timestamp (TS) and/or FrameOfSet/ChipOfSet) and at least one parameter out of a set of parameters characterizing network performance (e.g. propagation delay, RSCP, etc.).

The SON system is further configured to obtain (e.g. from OSS and or Planning Tool (not shown)) network configuration information (e.g. obtaining for a given Cell_ID longitude/latitude, azimuth, antenna type and parameters like pattern, power, etc.) and, optionally, device information (e.g. obtaining for a given IMSI manufacturer, model, version etc.).

The SON system (101) can be further operatively connected to a Customer Service Management (CRM) node (106) and/or Policy and Charging Rules Function (PCRF) node (107) and/or a billing system (108) and/or other client-related system.

The SON system is configured to obtain client-related data from one or more such client-related systems. Alternatively or additionally, the SON system can obtain client-related data directly from a network operator. Client-related data can be informative of priority values assigned to certain clients and/or client groups, a list of privileged clients, quality guaranteed for certain clients, etc. SON system can be configured to receive (in push and/or pull mode) client-related data periodically and/or responsive to predefined events.

The SON system further comprises a processor (105) operatively coupled to the memory (104) and configured to enable operations as detailed with reference to FIGS. 2-4. Optionally, the SON system can further comprise a memory (109) operatively connected to the memory (104) and processor (105). Optionally, the memory (104) can accommodate network-related data, client-related data and/or derivatives thereof received during a short-term period (e.g. last hour, last day, etc., while the memory 109 can be configured to accommodate data obtained from ND depositories, client-related system and, optionally, from other data sources (including Business Support System of mobile operator, data sources of $3^{rd}$ parties, etc.) during a long-term period. The processor (105) can be further configured, inter alia, to process data accommodated in the memory 109. Optionally, the processor (105) can comprise several processors including a processor dedicated for processing data accommodated in the memory (104) and another processor dedicated for processing data accommodated in the memory (109). Optionally, the SON system can be operatively connected to $3^{rd}$ party system accommodating and processing big data related to the network and the clients. Accordingly, the SON system can be configured to receive derivatives of big data processing (e.g. client's profiles and/or priority values) and accommodate them in the memory 109.

Unless specifically stated otherwise, it is appreciated that throughout the specification the terms "client-related data" and "network-related data" should be equivalently related to data accommodated in the memory (104) and to data accommodated in the memory (109).

The term "priority value assigned to a client" should be expansively construed to cover any kind of value indicative of the client's priority among other clients sharing QoS and/or QoE related privileges. The term "privileged client" should be expansively construed to cover any client with assigned priority value indicative that the client has higher priority among at least part of other clients sharing QoS and/or QoE related privileges.

Unless specifically stated otherwise, it is appreciated that throughout the specification the term "client" should be equivalently related to a network subscriber and/or to a device associated therewith.

The priority value can be pre-assigned to the client by a network operator in accordance with its identity (e.g. IMSI and/or subscriber name).

In accordance with certain embodiments of the presently disclosed subject matter and as will be further detailed with reference to FIGS. 2-4, the SON system can be configured to process client-related and/or network related data and dynamically derive the priority value to be assigned to the client. Accordingly, the SON system can be configured to assign priority values to clients with no pre-assigned priority values and/or can amend pre-assigned priority values.

Optionally, the SON system can be further configured to send to the one or more client-related systems the data related to priority value to be assigned to the client and derived by the SON system.

Those versed in the art will readily appreciate that the teachings of the presently disclosed subject matter are not bound by the network architecture illustrated in FIG. 1, equivalent and/or modified functionality can be consolidated or divided in another manner and can be implemented in any appropriate combination of software, firmware and hardware. The SON system can be a standalone network entity, or integrated, fully or partly, with other network entities.

Figure 2:
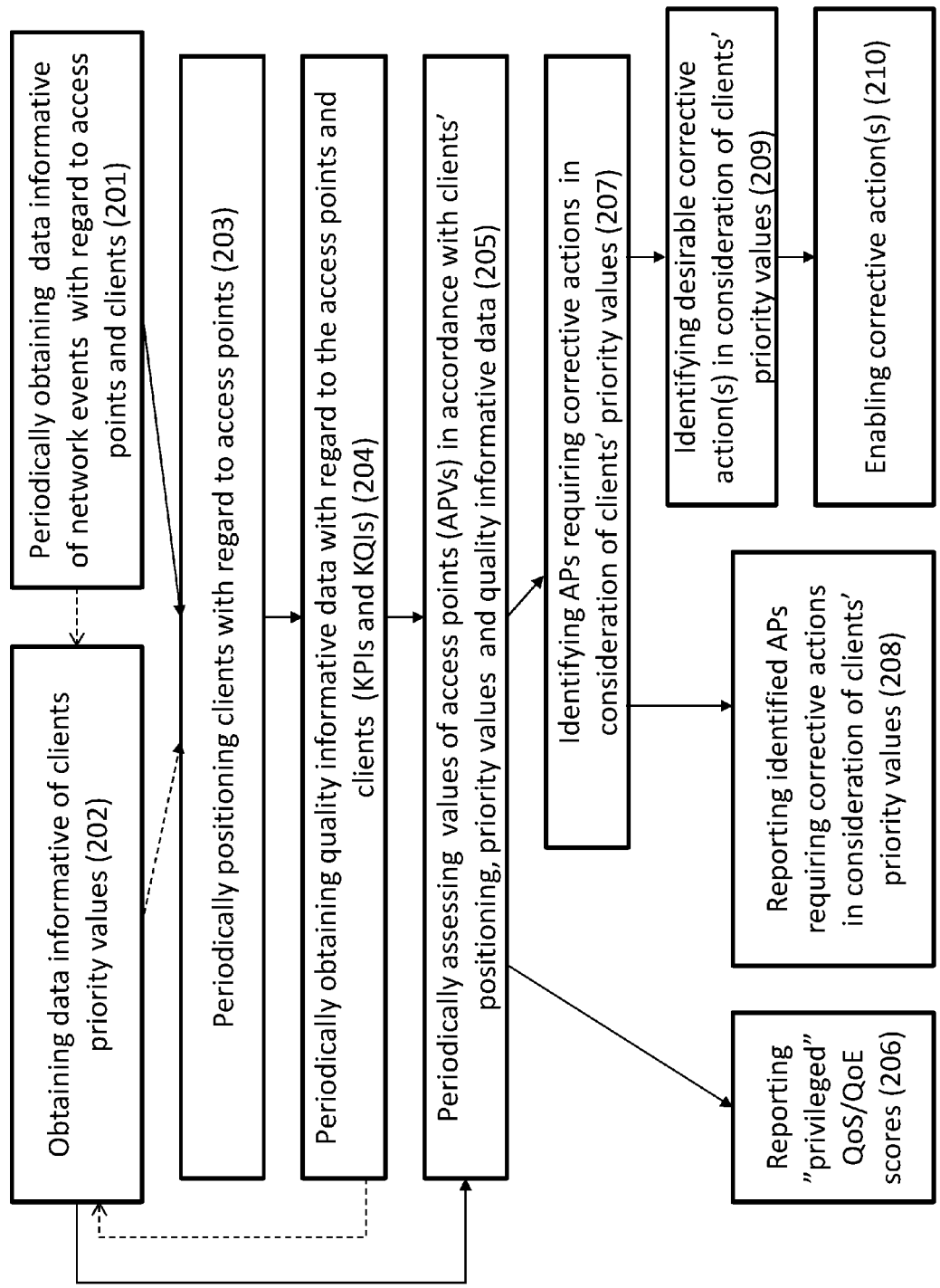
FIG. 2 illustrates a generalized flow chart of operating a Self Organizing Network in accordance with certain embodiments of the presently disclosed subject matter.

Referring to FIG. 2, there is illustrated a generalized flow chart of operating a Self Organizing Network in accordance with certain embodiments of the presently disclosed subject matter. The SON system periodically (e.g. with a period $P_{ND}$ specified as minimal collection time for a certain ND depository) obtains (201) data informative of network events with regard to access points and clients. Such data can be obtained by aggregating and periodically parsing data received from the one or more ND depositories (102). Optionally, ND depositories can be provided by different vendors and aggregating can include processing the obtained data into a common (or compatible) format whilst keeping all respective timestamps.

The SON system also obtains (202) data informative of priority values assigned to certain clients or groups thereof. Such data can be received from one or more client-related systems (e.g. CRM, PCRF, billing system, etc.) or directly from a network operator. Additionally or alternatively, priority values may be derived by the SON system from the received network related and/or client-related data (e.g. by processing currently received data and/or by processing data accommodated therein during a short-term period and/or a long-term period.

In accordance with certain embodiments of the currently presented subject matter, priority values can be assigned in accordance with client's identities and/or in accordance with time and space considerations and/or in accordance with applications running on the clients, etc.

By way of non-limiting example of priority values assigned in accordance with client's identity, the SON system can receive a list of privileged clients (e.g. enterprise clients, youngsters, VIP clients, etc.) with a priority value pre-assigned to each of the privileged clients, and assign to the rest of the clients an equal priority value, such equal priority value lower than the lowest priority value of the privileged client. Alternatively or additionally, the SON system can receive billing-related information and assign (and/or amend) priority values to the clients in accordance with respective billing information and predefined rules (e.g. it can add clients from the top 10% of clientele quarterly billing to the list of privileged clients, can reduce priority values of privileged clients from the bottom 10% of clientele quarterly billing, etc). The SON system can further use billing data, demographical data, usage patterns, and other client-related data for providing differentiation in priority values of privileged clients with the same priority value pre-assigned by a network operator.

Alternatively or additionally to assigning priority values in accordance with client's identity, the SON system can be configured to assign priority values in accordance with time and/or space. By way of non-limited example, priority values assigned to enterprise clients can differ depending on a time of day (e.g. working hours), client's location (e.g. in a train or on a highway), client moving/static classification, indoor/outdoor classification, etc.

Likewise, the SON system can be configured to obtain data indicative of applications associated with the clients (e.g. applications currently running by a given client, applications with average usage over a certain period of time, by a given client, exceeding a predefined threshold, etc.), and assign priority values accordingly. For example, priority values can be increased for clients using streaming-based applications, or an application manufactured by a specific provider.

The SON system can be further configured to periodically amend the assigned priority values by processing data received from ND depositories and informative of network events with regard to respective clients.

Figure 3:
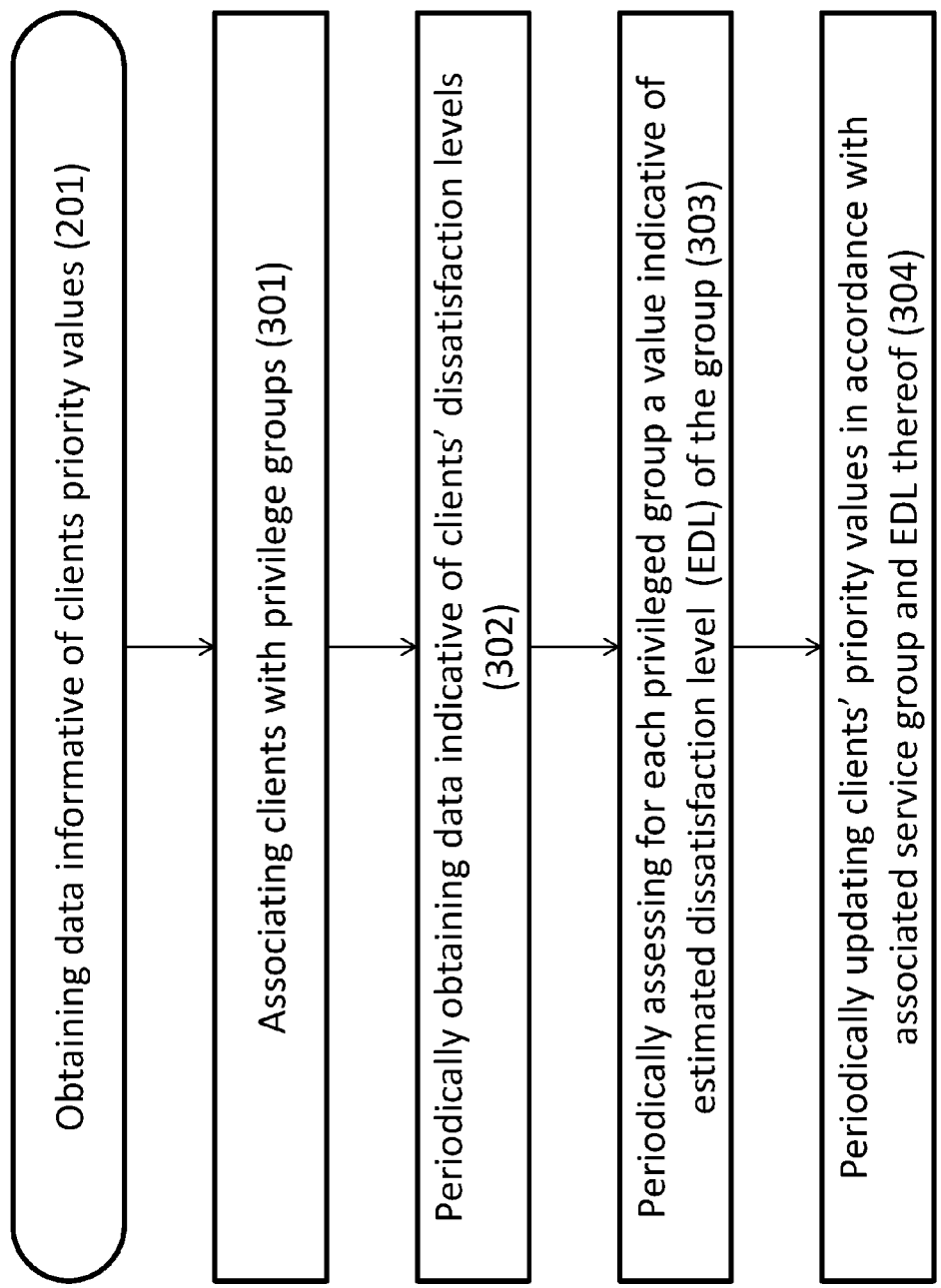
FIG. 3 illustrates a generalized flow chart of amending assigned priority values in accordance with dissatisfaction value of the clients in the network in accordance with certain embodiments of the presently disclosed subject matter.

FIG. 3 illustrates a non-limiting example of amending assigned priority values in accordance with dissatisfaction of the clients in the network.

In accordance with certain embodiments of the presently disclosed subject matter, the SON system uses the obtained data informative of assigned priority values for associating (301) each given client (C) with a privileged group PG=PG (C) among pre-defined privilege groups, the group having a privilege group weight PGW=PGW(C). The weight is higher for a group with a higher privilege. Clients with no assigned priority values can be associated with a privilege group dedicated to such clients and having the lowest weight. The SON system further obtains (302) data informative of a level of client dissatisfaction LD(C) during a substantive period (e.g. week or month). The level can be calculated by the SON system using pre-defined rules. By way of non-limiting example, it can be calculated for each client as a function of respective client-related KPIs and/or KQIs (e.g. it can correspond to a number of client-related KPIs non-matching a predefined criteria during a predefined time), a function of a number of predefined events (e.g. denial or delay in service, call drops, etc.) which occurred during a predefined time, etc. Optionally, the respective KPIs/KQIs and/or events can be weighted so that more recent events have higher weights.

The SON system periodically (e.g. with period $P=P_{ND}$) assesses (303) for each privilege group a value indicative of estimated dissatisfaction level (EDL) of the group, and further assesses (304), for each given client, an updated priority value in accordance with the associated privilege group and EDL thereof.

By way of non-limiting example, expected dissatisfaction level EDL of a privilege group can be calculated as:

EDL(PG)=ADS/PGW, where ADS is a current Average Dissatisfaction, ADS=$(\Sigma_{k=1}^{N}LD(Ck)*PGW(Ck))/N$, where $N$ is a number of clients in the network.

An updated priority value of a given client is equal to previously assigned priority value if LD(C)≤EDL(PG(C)). If LD(C)>EDL(PG(C)), the updated priority value of the given client shall be higher than the previously assigned priority value in accordance with the client's dissatisfaction LD(C). For example, in such case the priority value can be calculated as $$\text{PRIORITY}(C) = PGW(C) * \left(1 + \frac{LD(C) - EDL(PG(C))}{EDL(PG(C))}\right).$$

Thus, in accordance with certain embodiments of the currently presented subject matter, the SON system can periodically amend priority values assigned to the clients in accordance with pre-defined rules. The SON system can further report the amended priority values to other network entities.

Referring back to FIG. 2, The SON system periodically processes the data obtained from the ND depositories. Optionally, the periods of processing the obtained data can be equal to the periods ($P_{ND}$) of obtaining data from ND depositories. The SON system can process merely data aggregated from ND depositories during a last obtaining period or can process such data together with all or part of earlier obtained and aggregated data (and/or derivatives thereof). The processing of respective aggregated data can be provided in order to periodically position (203) the clients with regard to the access points. Positioning includes associating the clients with one or more access points and can further include locating the clients within the access points (e.g. defining respective position as, for example, cell edge or cell center). Positioning of a given client can be provided by using log records obtained during the respective period (e.g. ($P_{ND}$)), thus resulting in a list of access points serving the given client during this period (optionally including locations of clients within the respective access points). Alternatively or additionally, positioning of a given client can be provided by statistical analysis of available log records (and/or derivatives thereof) informative of the given client. As a result of statistical analysis, the given client can be associated with one or more access points most likely serving the client and characterized by most likely locations within these access points. The likelihood can be further analyzed with regard to day and week time and/or other client-related parameters. The obtained list of statistically associated access points can be further periodically updated. Optionally, the updating period can be substantially longer than the period $P_{ND}$ (e.g. the update can be provided daily, weekly or monthly). Optionally, as further detailed with reference to FIG. 4, positioning can be provided merely for the privileged clients.

The SON system further periodically (e.g. with periods equals to $P_{ND}$) obtains (204) quality informative data with regard to the access points and/or clients. The quality informative data can be obtained by periodically (e.g. with a period equal to $P_{ND}$) receiving such data directly from ND depositories (e.g. from performance management system (not shown)) and/or can be obtained by processing other data obtained from ND depositories. Quality informative data can be related to the clients' QoE (e.g. individual KQIs) and/or QoS per given access points (e.g. KPIs related to each given cell).

The SON system periodically assesses (205) values of access points (APVs) using the obtained positioning data and, optionally, quality informative data. APV can be indicative of a privilege level of a given access point and can be assessed in accordance with predefined rules as a function of priority values of clients associated with a given access point. The term "privilege level of an access point" should be expansively construed to cover any kind of value indicative of the access point priority for corrective actions if/when such required.

By way of non-limiting example, APV indicative of a privilege level of a given access point for a given assessing period $P_A$ can be calculated as $APV = \sum_{i=1}^{n}(PG_i * W_i) * N_i$, where $N_i$ is the number of clients associated with a given access point and having a priority value corresponding to a privileged group $PG_i$ weighed by a weight $W_i$, and n is a number of predefined privilege groups. $\sum_{i=1}^{n} N_i$ is equal to the total number of privileged clients associated with the given access point during the given period $P_A$. During the assessing period $P_A$, a given client can be served by (and, accordingly, is associated with) a plurality of access points, each access point at a different timeframe during the period $P_A$. In such a case, the APV calculation can include additional weighting indicative of proportional time served by the given access point. If a given client has been statistically associated with a plurality of access points, the APV function can include additional weight indicative of proportional likelihood of serving the given client by the given access point.

If the priority values of the clients associated with the given access point during the given period have been updated in accordance with their dissatisfaction levels (e.g. in a manner detailed with reference to FIG. 3), the privilege level assessed as above can be further informative of respective dissatisfaction.

Alternatively or additionally, APV can be indicative of "privileged" QoS and/or QoE of the given access point, i.e. QoS/QoE calculated in consideration of priority values of the clients associated with the given access point during the given period $P_A$. Accordingly, the SON system can be configured to identify quality informative data related to "priority-matching" clients, i.e. clients having priority values matching a certain priority criteria (e.g. priority values corresponding to a predefined privilege group; priority values exceeding average priority values of clients associated with the given access point during the given period $P_A$ by predefined percent; etc.). The SON system can be further configured to calculate respective APV in accordance with predefined rules as a function of quality informative data related for such "priority-matching" clients. APV can be calculated as a combination of QoS and QoE scores of the access point calculated in consideration of priority values of the clients (such scores are referred to hereinafter as "privileged scores"). Typically, the services and respective KPIs and KQIs to be used for QoS and QoE score calculations are defined by a network operator.

By way of non-limiting example, a "privileged" QoS score can be calculated as a ratio between summarized individual KPIs of "priority-matching" clients and summarized individual KPIs of all clients associated with the given access point during the given period $P_A$; and a "privileged" QoE score can be calculated as a ratio between summarized individual KQIs of "priority-matching" clients and summarized individual KQIs of all clients associated with the given access point during the given period $P_A$.

By way of another non-limiting example, a "privileged" QoS/QoE score can be calculated as a ratio between summarized, for all clients associated with the given access point during the given period $P_A$, individual KPIs/KQIs weighed by respective priority values, and summarized un-weighed individual KPIs/KQIs of all these clients.

APV can be calculated separately for each period $P_A$ (e.g. with a period $P_A = P_{ND}$). Alternatively, APV can be calculated statistically using data aggregated during a period $P >> P_{ND}$ and can be further periodically (e.g. with a period $P_A = P_{ND}$) updated (optionally, recent values can be processed with higher weights). APV can be assessed as a combined value indicative of priority and quality aspects, or as a set of separate values, each one related to a respective aspect.

Optionally, APV can be assessed in further consideration with location of access point (e.g. access points serving highway and railway traffic, certain events, VIP locations, etc.).

Alternatively or additionally to assessment of APV in consideration of priority values of the clients, the SON system can be configured to assess APV in consideration of applications served by a given access point. For example, each type of application (e.g. streaming applications, social networks, location-based applications, application by a specific manufacturer etc.) can be associated with a respective priority value, and APV of a given access point can be calculated in accordance with priority of applications served by the given access point during the period $P_A$.

The SON system can further report (206) the calculated "privileged" QoS/QoE scores to one or more client-related systems (e.g. to CRM system 106 or PCRF node 107), thereby enabling dynamic monitoring of QoS/QOE of a given access point in consideration of priority values of the clients associated with the given access point during the given period $P_A$.

Alternatively or additionally, the SON system can use the assessed APVs for periodically identifying (207) access points requiring, in consideration of priority values of the clients associated with the given access point during the given period $P_A$, corrective actions. By way of non-limiting example, such access points can be identified in accordance with non-conformity between predefined QoS/QoE scores corresponding to a privilege level indicative by APV of a given access point and the respective calculated QoS/QoE scores. By way of another non-limiting example, such access points can be identified in accordance with non-conformity between QoS/QoE scores predefined for a given access point and "privileged" QoS/QoE scores calculated for the given access point. The non-conformity can be defined as a statistical value calculated during a certain period of time $P >> P_{ND}$, a current value calculated by merely using data obtained during $P_{ND}$, a current value calculated by using positioning data obtained during $P_{ND}$ and statistic-based quality informative data, etc.

Optionally, in order to require corrective actions, the access point shall meet additional criteria as, by way of non-limiting example, APV shall be indicative of privilege level exceeding a predefined threshold.

Further, the SON system can report (e.g. to PCRF node) (208) about identified access points requiring corrective actions in consideration of priority values of associated clients.

Alternatively or additionally to reporting (208), the SON system can analyze the APV of a given identified access point, identify (209), in consideration of priority values of associated clients, one or more corrective actions desirable with regard to appropriate manageable resources, and enable (210) such actions. The manageable resources include transmission power, baseband processing capacity, transmission (or backhaul) links to the access points, RNC (Radio Network Controller) resources, etc. The corrective actions can include load balancing, antenna optimization, small cell planning, etc., and can be provided using any appropriate technique, some of them disclosed in the references cited in the background and incorporated thereto by reference in their entireties. As will be further detailed with reference to FIG. 4, desirable corrective actions can be further identified in consideration of the client's positioning within the access points.

Figure 4:
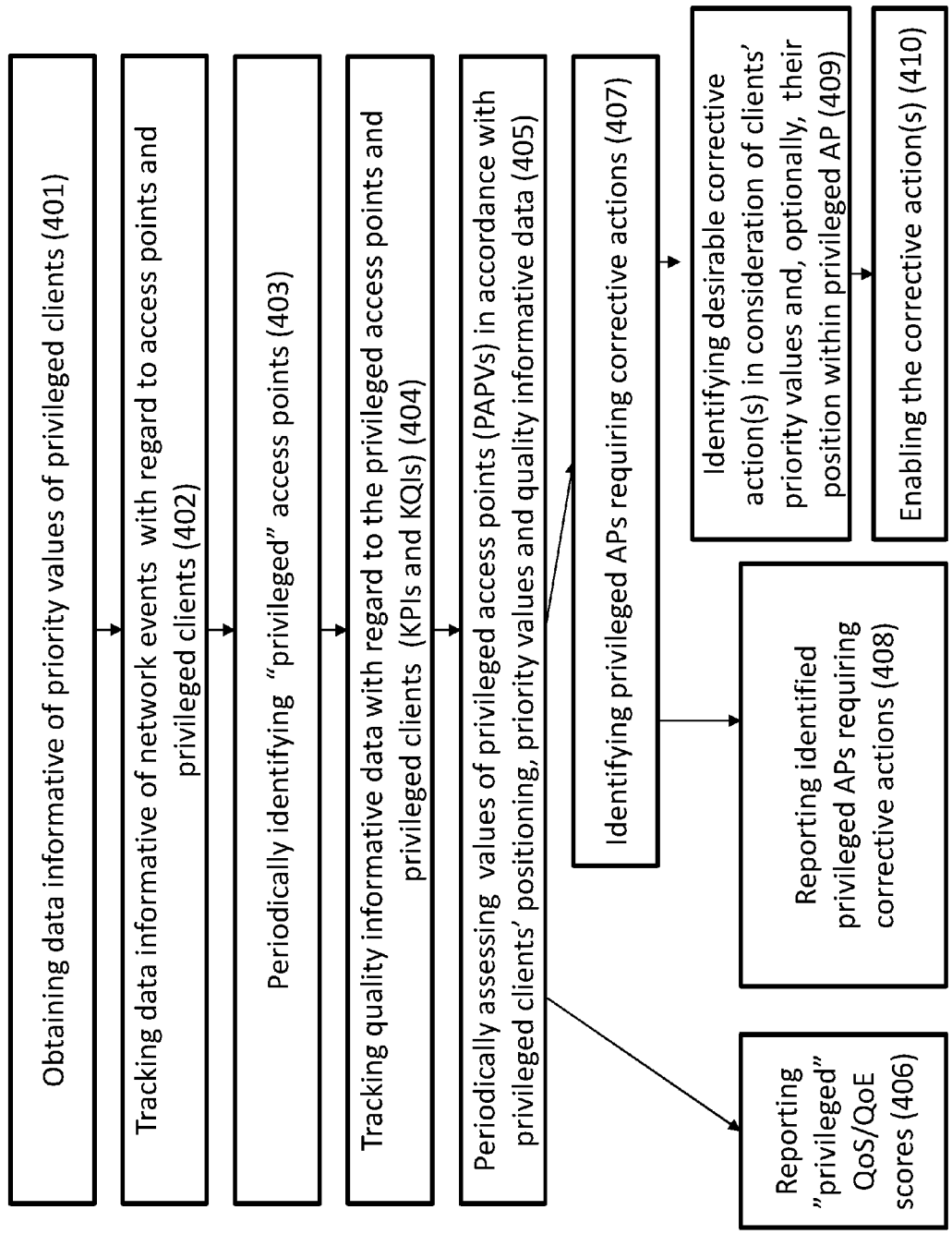
FIG. 4 illustrates a generalized flow chart of exemplified operation of a Self Organizing Network in accordance with certain embodiments of the presently disclosed subject matter.

Referring to FIG. 4, there is illustrated an exemplified embodiment of SON operating as detailed with reference to FIG. 2, wherein the SON system is configured, inter alia, to identify privileged access points and provide monitoring thereof. Upon obtaining (401) data indicative of privileged clients (e.g. a list of privileged clients with a priority value assigned to each of the privileged clients), the SON system tracks (402) data informative of network events with regard to the privileged clients. As was detailed with reference to FIG. 2, the list of privileged clients and/or respective priority values can be updated by the SON system in accordance with received network and/or client-related information.

The SON system periodically processes data informative of network events with regard to the privileged clients in order to position the privileged clients with regard to the access points, and thereby identifies one or more access points associated with the privileged clients. Positioning of a given privileged client can be provided by using log records obtained during the processing period (e.g. ($P_{ND}$)), thus resulting in a list of access points serving the given privileged client during this period. Alternatively or additionally, positioning of a given client can be provided by statistical analysis of available log records (and/or derivatives thereof) informative of the given client. As a result of statistical analyses, the given privileged client can be associated with one or more access points most likely serving the client.

The SON system further periodically identifies (403), among the access points associated with the privileged clients, a plurality of privileged access points. The selection can be provided among access points serving the privileged clients during the processing period.

By way of non-limiting example, all access points associated during the processing period with the privileged clients can be selected as the privileged access points. Alternatively, privileged access points can be selected if matching predefined selection criteria (e.g. minimal number of privileged clients associated with a given access point during $P_{ND}$ and/or during a period $P \gg P_{ND}$; minimal frequency of associating a minimal number of privileged clients with a given access point during a period $P \gg P_{ND}$; minimal total duration (and/or volume) of serving privileged clients during $P_{ND}$ and/or during a period $P \gg P_{ND}$, etc.).

Alternatively or additionally, selection can be provided among access points statistically associated with the privileged clients and matching predefined selection criteria (and not necessarily serving the privileged clients during a given processing period). Selection criteria can further depend on statistical data derived from privileged clients' behavior (e.g. day and/or week time). A list of statistically selected privileged access points can be periodically updated (e.g. daily, weekly or monthly).

The SON system further tracks (404) quality informative data with regard to the privileged access points and/or privileged clients associated with the privileged access points. Quality informative data can be related to the QoE (e.g. individual KQIs) and/or QoS per given access points (e.g. KPIs related to each given access point).

The SON system periodically (e.g. with period $P_A = P_D$) assesses (405) values of the privileged access points (PAPVs). PAPV of a given privileged access point can be indicative of QoS and/or QoE of the given privileged access point. Alternatively or additionally, PAPV can be indicative of "privileged" QoS and/or QoE of the given privileged access point, i.e. QoS/QoE calculated in consideration of priority values of the privileged clients associated with the given access point during the given period $P_A$.

Alternatively or additionally, PAPV assessed to a given privileged access point can be indicative of a privilege level of the given privileged access point which can depend on a number of privileged clients associated with the privileged access point during the assessing period (and on their priority values in case the values differ for different privileged clients). Optionally, PAPV can be assessed in further consideration with location of a given access point (e.g. access points serving highway and railway traffic, certain events, VIP locations, etc.).

Alternatively or additionally, PAPV assessed to a given privileged access point can be indicative of priority of applications served by the given access point during the period $P_A$.

By way of non-limiting example, PAPV can be calculated in a manner detailed with reference to FIG. 2.

By way of another non-limiting example, PAPV can be indicative of priority value and dissatisfaction value of the clients associated with the given privileged access point during a given period. Such PAPV can be assessed in a manner similar to detailed above with reference to FIG. 3.

The SON system further uses, in a manner similar to that detailed with reference to FIG. 2, the assessed PAPV values for reporting (406) the QoS/QoE score (and/or privileged QoS/QoE score) periodically calculated for the privileged access points, identifying (407) and reporting (408) privileged access points requiring corrective actions. Upon identifying privileged access points requiring corrective actions, the SON system identifies (409) desirable corrective actions and enables them (410). Corrective actions can be related to the privileged access points and, optionally, to the access points neighbouring the privileged access points. Corrective actions can be identified and enabled in consideration of priority values of the clients associated with the privileged access point and, optionally, in consideration of location of privileged clients within a given privileged access point.

By way of non-limiting example, if QoS and/or QoE scores of a given privileged access point are indicative of a poor quality of a voice service, while privileged QoS and/or QoE scores of the privileged clients are indicative of satisfactory quality of the voice service, no corrective actions are desirable. If privileged QoS and/or QoE scores are indicative of poor quality of voice service provided to privileged clients, whilst the privileged clients are located at the center of the serving area of the privileged access point, the desirable action can be down-tilting antennas in neighboring access points to improve the signal-to-interference ratio and, thereby, to improve quality of service for the privileged client.

By way of another non-limiting example, if privileged QoS and/or QoE are indicative of low throughput, the desirable corrective actions can depend on location of the privileged clients within the serving privileged access point. If most of the privileged clients are located in the center of the serving privileged access point, the desirable action is load balancing between the serving access point and the neighboring access points by, for example, affecting handover parameters or pilot power of privileged access point and neighboring access points, and thus shifting low value customers to neighboring cells. If most of the privileged clients are located at the edge of the serving privileged access points (i.e. suffering from low throughput due to lack of capacity in the serving cell and neighboring cells), the desirable corrective action is recommendation for installing a small cell.

Figure 5:
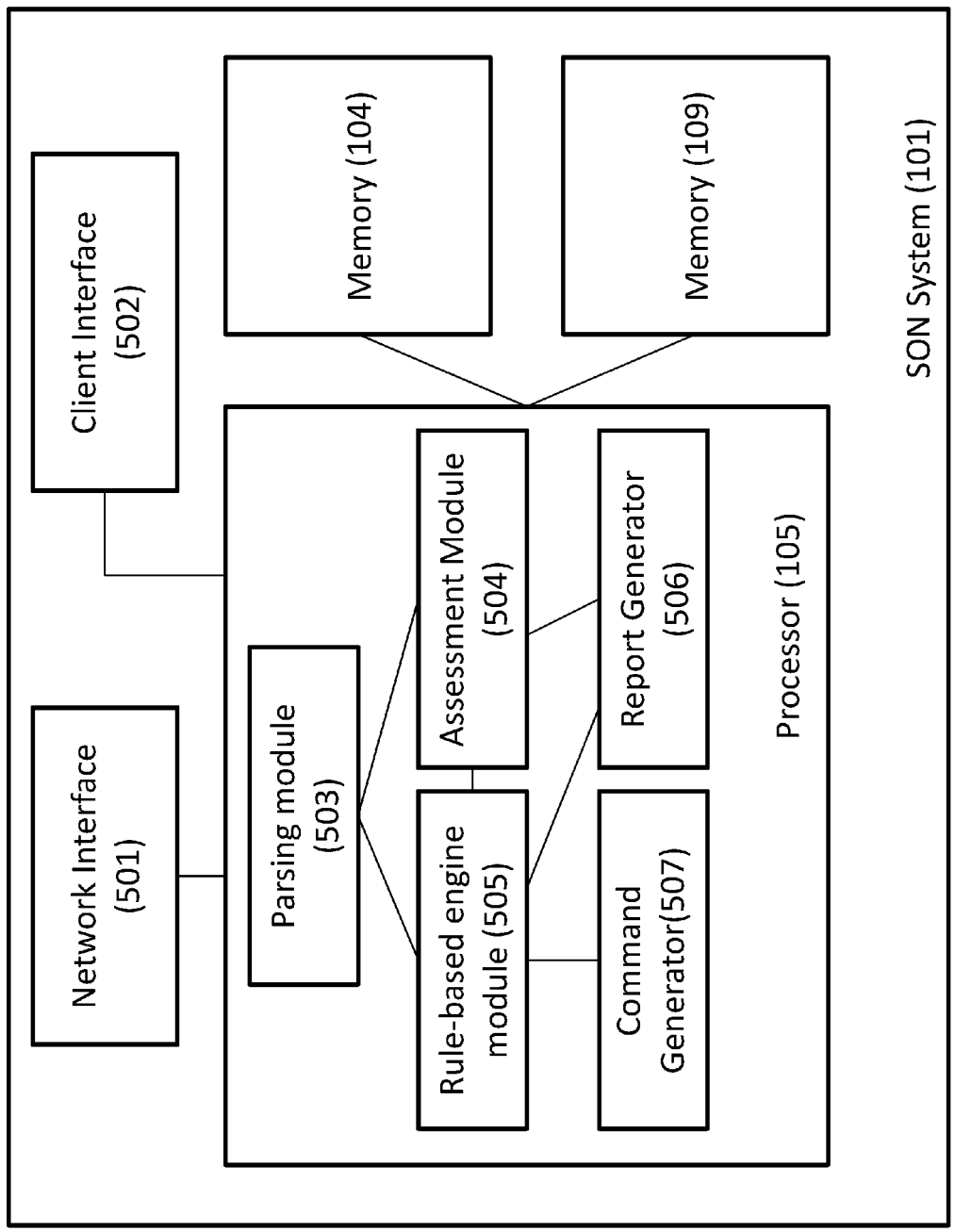
FIG. 5 illustrates a generalized functional diagram of the SON system in accordance with certain embodiments of the presently disclosed subject matter.

Referring to FIG. 5, there is illustrated a generalized functional diagram of the SON system in accordance with certain embodiments of the presently disclosed subject matter. The SON system (101) can be implemented as a stand-alone platform or integrated, fully or partly, with other network entities (e.g. OSS, CRM, PCRF, etc.). The SON system comprises a processor (105) operatively coupled to a first interface (501) (e.g. a first port) and a second interface (502) (e.g. a second port). The first interface (referred to hereinafter also as a network interface) is configured to receive from ND depositories data informative of network events and to forward the received data and/or derivatives thereof to the processor 105 and/or memories 104 and/or 109 operatively coupled to the processor. The second interface (referred to hereinafter also as a client interface) is configured to receive client-related data from one or more client-related systems, and to forward the received data and/or derivatives thereof to the processor 105 and/or to a memories 104 and/or 109. The processor 105 is configured to provide necessary processing of the accommodated client and network related data in accordance with operations detailed with reference to FIGS. 2-4.

The processor can comprise the following operatively coupled functional modules: parsing module 503, assessment module 504, rule-based engine module 505, report generator 506 and command generator 507. The parsing module 503 can be configured to process network-related data accommodated in the memory 104/109 in order to position the clients with regard to the access points, as well as to obtain quality informative data with regard to the access points and clients. The parsing module can be further configured to provide clients' positioning and quality informative data to the assessment module 504. The assessment module 504 can be configured to generate and/or update priority values assigned to the clients, to identify privileged access points and to assess access point values as detailed with reference to FIGS. 2-4. Rule-based engine 505 is configured to use predefined rules for identifying privileged access points requiring corrective actions and for identifying desirable correction actions. The report generator 506 is configured to generate reports (e.g. informative of QoS/QoE scores received from the assessment module 504, informative of access point requiring corrective actions identified by the rule-based engine module 505, etc.) to be sent to one or more client-related systems via the client interface 502. The command generator module 507 is configured to generate and send commands and/or alerts in accordance with desirable corrective actions identified by the rule-based engine module 505.

Those skilled in the art will readily appreciate that the presently disclosed subject matter is not bound by the configuration of FIG. 5; equivalent and/or modified functionality can be consolidated or divided in another manner and can be implemented in any appropriate combination of software, firmware and hardware. Those skilled in the art will also readily appreciate that the data repositories can be consolidated or divided in other manner; databases can be shared with other systems or be provided by other systems, including third party equipment.

It is to be understood that the presently disclosed subject matter is not limited in its application to the details set forth in the description contained herein or illustrated in the drawings. The presently disclosed subject matter is capable of other embodiments and of being practiced and carried out in various ways.

It will also be understood that the presently disclosed subject matter further contemplates a non-transitory machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized system configured to operate in a self-organizing network comprising a plurality of access points serving a plurality of clients, the system comprising a processor operatively connected to a first interface configured to periodically obtain data informative of network events with regard to access points among the plurality of access points and to respectively served clients and to a second interface configured to periodically receive client-related data informative, at least, of priority values assigned to clients among the plurality of clients, wherein the processor is configured:
   upon obtaining data indicative of privileged clients among the plurality of clients, parsing the data informative of network events to track data informative of network events with regard to the privileged clients;
   to process the data informative of network events with regard to the privileged clients, thereby periodically associating the privileged clients with the access points and periodically identifying one or more privileged access points;
   to track quality informative data with regard to the privileged access points and periodically assess to each of one or more privileged access points among the plurality of access points a value being a function of priority values assigned to clients associated with the respective access point during an assessing period and quality informative data related to privileged clients associated with the given privileged access point during the assessing period; and
   to use the assessed values for periodically identifying at least one privileged access point requiring at least one corrective action.

2. The computerized system of claim 1, wherein the processor is further configured to periodically use the values assessed to the at least one identified privileged access point requiring at least one corrective action for identifying at least one desirable corrective action, thereby enabling corrective actions in consideration of priority values of associated clients.

3. The computerized system of claim 1, wherein the second interface is configured to receive a list of privileged clients, each client characterized by a pre-assigned priority value, and the processor is configured to obtain at least part of data indicative of privileged clients and priority values assigned thereto from the list.

4. The computerized system of claim 1, wherein the processor is further configured to periodically update data indicative of privileged clients among the plurality of clients, wherein updating comprises processing data periodically received via the first and/or the second interface, the data selected from a group constituted by data informative of network events, billing-related data and usage-related data.

5. The computerized system of claim 1, wherein the processor is further configured to periodically reassign at least part of priority values to be used for assessing the values to the privileged access points, wherein reassigning comprises processing data periodically received via the first and/or the second interface, the data selected from a group constituted by data informative of network events, billing-related data and usage-related data.

6. The computerized system of claim 1, wherein the processor is further configured to periodically reassign at least part of priority values to be used for assessing the values to the one or more access points, wherein reassignment is provided by using dissatisfaction-related data at least partly derived by the processor from data informative of network events, and wherein a value assessed to a given access point is further indicative of dissatisfaction of clients associated with a respective access point during the assessing period.

7. The computerized system of claim 1, wherein any access points associated during the assessing period with the privileged clients is identified as the privileged access points.

8. The computerized system of claim 1, wherein the periodically identifying one or more privileged access points comprises selecting, among access points associated with the privileged clients during the assessing period, one or more access points matching predefined selection criteria, such access points identified as the privileged access points.

9. The computerized system of claim 1, wherein periodically identifying one or more privileged access points comprises selecting, among access points statistically associated with the privileged clients, one or more access points matching predefined selection criteria, such access points identified as the privileged access points, and wherein statistical association between access points and privileged clients is periodically updated.

10. The computerized system of claim 1, wherein the processor is further configured:
   periodically identify, to each of the one or more privileged access points, clients with assigned priority values matching a priority criteria, thus giving rise to priority-matching clients;
   identify quality informative data related to the priority-matching clients; and
   use the identified quality informative data when periodically assessing values to respective access points, wherein each given assessed value being further a function of quality informative data related to priority-matching clients.

11. The computerized system of claim 10, wherein all privileged clients match the priority criteria.

12. The computerized system of claim 10, wherein the processor is further configured to use the identified quality informative data for calculating, for each of the one or more privileged access points, privileged QoS/QoE scores, thereby enabling dynamic monitoring of QoS/QOE of the one or more privileged access points in consideration of priority values of the clients associated with respective privileged access points during the assessing period.

13. The computerized system of claim 12, wherein identifying the at least one privileged access point requiring at least one corrective action is provided in accordance with non-conformity between privileged QoS/QoE scores predefined to the one or more privileged access points and privileged QoS/QoE scores calculated for the respective privileged access points using the identified quality informative data.

14. The computerized system of claim 13, wherein associating the clients with the privileged access points further comprises locating the clients within the privileged access points, and wherein the at least one corrective action is identified in further consideration of locations of the clients associated with the at least one identified privileged access point requiring at least one corrective action.

* * * * *